US010832574B1

(12) United States Patent
Agarwal et al.

(10) Patent No.: US 10,832,574 B1
(45) Date of Patent: Nov. 10, 2020

(54) PARKING SPOT AVAILABILITY PREDICTION SYSTEMS AND METHODS

(71) Applicant: Ford Global Technologies, LLC, Dearborn, MI (US)

(72) Inventors: Akash Agarwal, Santa Clara, CA (US); Sandeep Raj Gandiga, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/406,883

(22) Filed: May 8, 2019

(51) Int. Cl.
*B60Q 1/48* (2006.01)
*G08G 1/14* (2006.01)
*G06Q 50/30* (2012.01)

(52) U.S. Cl.
CPC ............ *G08G 1/141* (2013.01); *G06Q 50/30* (2013.01)

(58) Field of Classification Search
None
See application file for complete search history.

(56) References Cited

U.S. PATENT DOCUMENTS

2012/0056758 A1 3/2012 Kuhlman et al.
2015/0279213 A1* 10/2015 Balter .................... G01C 21/36 705/13

OTHER PUBLICATIONS

Khanna, et al., "IoT based smart parking system," 2016 International Conference on Internet of Things and Applications (IOTA), Pune, 2016, pp. 266-270. doi: 10.1109/IOTA.2016.7562735.
Searching for Parking Costs Americans $73 Billion a Year (Jul. 12, 2017). Retrieved from http://inrix.com/press-releases/parking-pain-us/ (7 pages).

* cited by examiner

*Primary Examiner* — Adolf Dsouza
(74) *Attorney, Agent, or Firm* — Brandon Hicks; Eversheds Sutherland (US) LLP

(57) ABSTRACT

Systems and methods for predicting the availability of parking spots. A driver of a first vehicle that is parked in a parking spot inputs into a device, such as a smartphone, an estimated time of occupancy of the parking spot. This information is transmitted by the device to a server. A driver of a second vehicle may transmit to the server a request for a vacant parking spot. The server uses information, such as the estimated time of occupancy, to determine an expected wait time for the second vehicle to obtain the parking spot occupied by the first vehicle. The expected wait time is transmitted by the server to the driver of the second vehicle which can then drive to the parking spot when vacated. The server may provide driving directions to the driver to reach the vacated parking spot.

14 Claims, 8 Drawing Sheets

PARKING SPOT AVAILABILITY PREDICTION SYSTEMS AND METHODS

FIELD OF THE DISCLOSURE

This disclosure generally relates to automobiles, and more particularly relates to predicting parking spot availability for one or more automobiles.

BACKGROUND

Finding a parking spot in a busy location such as a downtown area in a city can be time consuming and frustrating. Typically, a driver of an automobile cruises around in the area until he/she sees an unoccupied parking spot. There is no easy way to estimate how long it would take to find the unoccupied parking spot. Consequently, the driver has to allocate a significant amount of time for parking and hope that the allocated time turns out to be adequate. In some cases, the allocated time may be too much and the driver may be forced to spend time by sitting in the automobile at the parking spot or by walking around near the parking spot.

Some traditional solutions for addressing parking issues can involve the use of a map or a global positioning system (GPS) device to identify ahead of time, one or more parking lots where multiple parking spots may be available. However, it is difficult and/or hazardous for the driver to examine a map while driving the automobile. A GPS device is somewhat more helpful in this situation because the GPS device can display icons to indicate parking lots in the vicinity of the automobile. The amount of information provided by such icons is limited because the driver is unable to determine from this information whether a nearby parking lot has any unoccupied parking spots.

It is therefore desirable to provide solutions that would assist a driver to find a parking spot in a timely manner and with a good likelihood of success.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
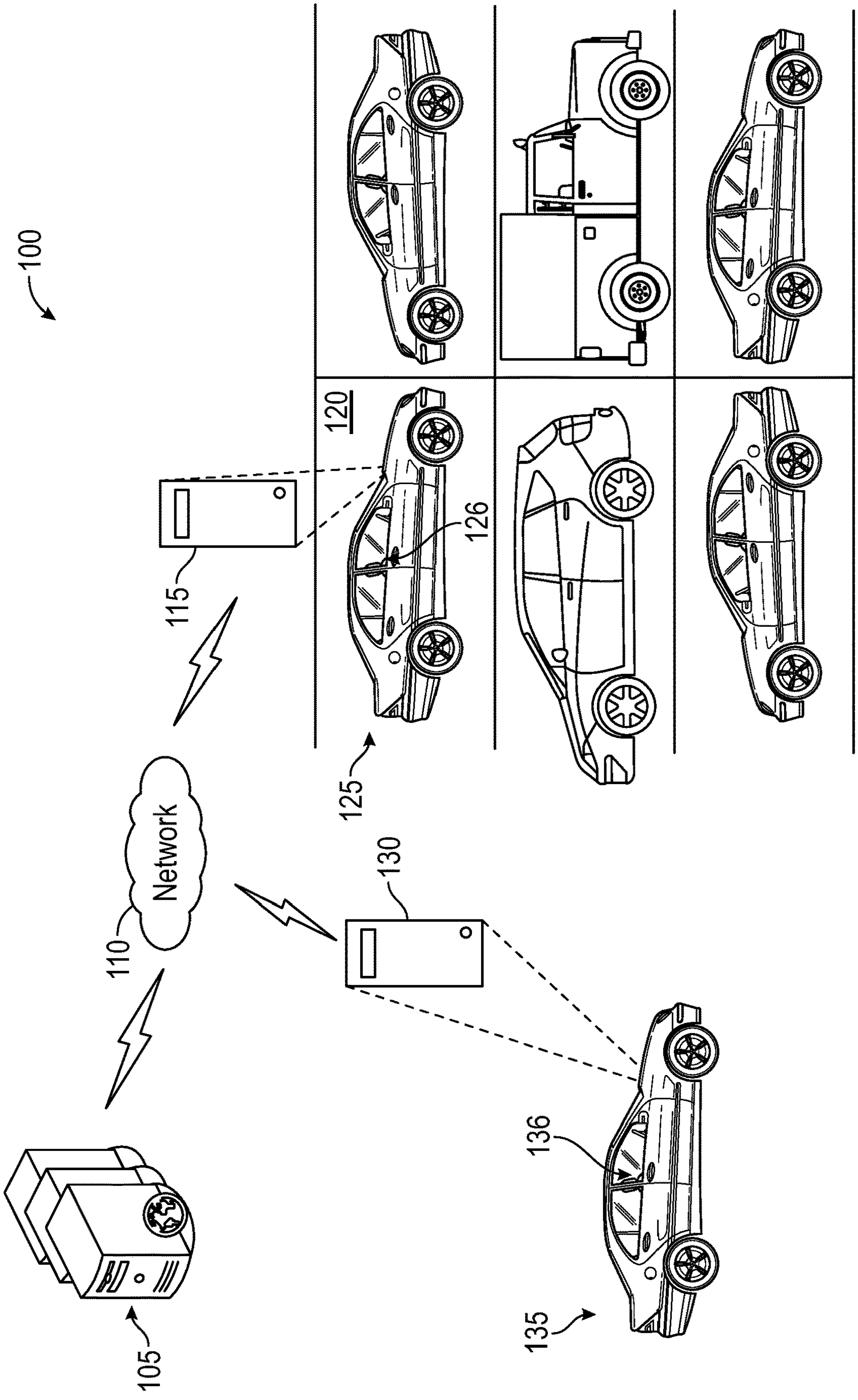
FIG. 1 illustrates a first exemplary embodiment of a parking spot availability prediction system in accordance with the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, the word "automobile" may be used interchangeably with the word "vehicle," the word "unoccupied" may be used interchangeably with the word "vacant," and the word "predict" may be used interchangeably with the word "estimate." The phrase "parking spot" as used herein should be generally understood as equivalent to other phrases such as "parking space" and "parking slot." It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods for predicting the availability of a parking spot that is currently occupied by a first automobile. In one exemplary embodiment, a driver of the first automobile that is parked in the parking spot inputs into a device (such as a smartphone or an onboard computer), an estimated time of occupancy of the parking spot. This information is transmitted to a server. A driver of a second automobile who is seeking an unoccupied parking spot can transmit to the server a request for a vacant parking spot. The server uses information such as the estimated time of occupancy to determine an expected wait time for the second automobile to obtain the parking spot that is currently occupied by the first automobile. The expected wait time is transmitted by the server to the second automobile which can then drive to the parking spot when vacated. The server may provide driving directions to the driver of the second automobile to reach the vacated parking spot.

FIG. 1 illustrates a first exemplary embodiment of a parking spot availability prediction system 100 in accordance with the disclosure. The system 100 can include a server 105 that is coupled to a network 110 for communicating with computers located in various automobiles. The network 110 can be one or more of a wide area network (WAN), a telephone network, a cellular network, a wireless network, and/or a public network such as the Internet. In this first exemplary embodiment, a first automobile 125 is parked in a parking spot 120 that is one of several parking spots located in a parking lot. In another exemplary embodiment, the first automobile 125 may be parked in an isolated parking spot such as near a curb or building. A driver 126 of the first automobile 125 may use a computer 115 to communicate with the server 105 via the network 110. The computer 115 can be a smartphone, a tablet computer, a laptop computer, or any other computing device carried by the driver 126. The computer 115 can also be an onboard computer that is mounted in the first automobile 125, or a computer that is a part of an apparatus such as an engine controller of the first automobile 125.

In one exemplary implementation, the computer 115 is a smartphone containing a software application that can operate as a communications interface for the driver 126 to communicate with the server 105. The software application may prompt the driver 126 to provide an estimate as to how long the driver 126 expects to leave the first automobile 125 parked in the parking spot 120. The prompt may be sent out prior to the driver 126 exiting the first automobile 125. The driver 126 may determine an estimated time of occupancy of the parking spot 120 based on, for example, a nature of an errand that the driver 126 intends to accomplish after exiting the first automobile 125. The estimated time of occupancy is transmitted by the computer 115 to the server 105 via the network 110. Upon receiving the estimated time of occupancy, the server 105 may generate a timestamp indicative of a start time of occupancy of the parking spot 120 by the first automobile 125. The estimated time of occupancy received from the computer 115 and the timestamp generated by the server 105 may be stored in a database of the server 105 for further use.

The computer 115 may also transmit additional information such as identification data pertaining to the first automobile 125 and/or location coordinates of the parking spot 120. Some examples of identification data pertaining to the first automobile 125 may include a vehicle identification number (VIN) of the first automobile 125, a model and make of the first automobile 125, and/or a color of the first automobile 125. The location coordinates of the parking spot 120 may be obtained from a GPS device in the first automobile 125 or may be generated by the computer 115 using other methods. The various pieces of information associated with the first automobile 125, such as the estimated time of occupancy of the parking spot 120, the identification data pertaining to the first automobile 125 and/or the location coordinates of the parking spot 120, may be stored by the server 105 in a database of the server 105 in the form of a parking record associated with the first automobile 125.

A second automobile 135 may enter the parking lot at a later instant in time. A driver 136 of the second automobile 135 may use a computer 130 to communicate with the server 105 via the network 110. The computer 130 can be a smartphone, a tablet computer, a laptop computer, or any other computing device carried by the driver 136. The computer 130 can also be an onboard computer that is mounted in the second automobile 135 or a computer that is a part of an apparatus such as an engine controller of the second automobile 135. In one exemplary implementation, the computer 130 is a smartphone containing a software application that can operate as a communications interface for the driver 136 to communicate with the server 105. The software application may be substantially similar to the software application used by the driver 126 of the first automobile 125 to communicate with the server 105.

Upon entering the parking lot, the driver 136 notices that all parking spots are occupied. The driver 136 then uses the software application in the smartphone to transmit a request to the server 105 for information pertaining to any upcoming vacancy in the parking spots. The server 105 responds to the request by determining an estimated wait time for the second automobile 135 to obtain the parking spot 120 occupied by the first automobile 125. The estimated wait time may be calculated by using various parameters such as the estimated time of occupancy provided by the driver 126, the associated timestamp generated by the server 105, and a time at which the request is received by the server 105 from the computer 130.

In a first example scenario to illustrate this procedure, the driver 126 of the first automobile 125 provides 30 minutes as an estimated time of occupancy of the parking spot 120. An exemplary timestamp generated by the server 105 upon receipt of the estimated time of occupancy is 5:17 PM. Based on these example parameters, the server 105 can determine that parking spot 120 is expected to fall vacant at 5:47 PM. The request made by the driver 136 of the second automobile 135 is received for example, at 5:30 PM. Based on the time of receipt of the request (5:30 PM) and the expected time of vacating of the parking spot 120 (5:47 PM), the server 105 can determine that the expected wait time for the second automobile 135 to obtain the parking spot 120 is 17 minutes. The expected wait time of 17 minutes may be communicated by the server 105 to the computer 130 in the second automobile 135.

In a second example scenario, the estimated time of occupancy provided by the driver 126 of the first automobile 125 is 30 minutes and the timestamp generated by the server 105 is 5:17 PM. Based on these example parameters, the server 105 can start a countdown (by using a countdown timer, for example). The request made by the driver 136 of the second automobile 135 is received for example, at 5:30 PM. The countdown timer indicates a wait time of 17 minutes at the time the request is received (5:30 PM). The expected wait time of 17 minutes may be communicated by the server 105 to the computer 130 in the second automobile 135.

The driver 136 of the second automobile 135 may opt to notify the server 105 of a willingness to accept the wait time. Upon receipt of the willingness notification, the server 105 may request the computer 115 to provide an indication at a time of vacating of the parking spot 120 by the first automobile 125. If the first automobile 125 vacates the parking spot 120 at the designated time (5:47 PM in the example above), the server 105 transmits to the computer 130 of the second automobile 135, directions to drive to the vacated parking spot 120. The directions may be provided for example, upon a display screen of the computer 130 in real time in a manner similar to that used by a traditional GPS device.

In one example implementation of this embodiment, the server 105 may transmit directions to the computer 130 prior to the vacating of the parking spot 120 by the first automobile 125 (for example, at 5:42 PM in the scenario described above) so as to enable the second automobile 135 to reach the parking spot 120. The server 105 may also provide to the computer 130 of the second automobile 135, the identification data of the first automobile 125 to help the driver 136 of the second automobile 135 identify the first automobile 125 and consequently, the parking spot 120 in which the first automobile 125 is parked. However, in some implementations, the server 105 may be configured to prevent transmitting of the identification data, as a security measure to prevent endangerment of the driver 126 of the first automobile 125 in case the driver 136 of the second automobile 135 has malicious intent.

In some cases, the driver 126 of the first automobile 125 may be unwilling, or unable, to provide an estimated time of occupancy of the parking spot 120. If so, the computer 115 in the first automobile 125 may transmit information such as identification data pertaining to the first automobile 125 and/or location coordinates of the parking spot 120 but not the estimated time of occupancy. In such cases, the server 105 may be unable to calculate an estimated wait time for the second automobile 135. However, the server 105 will now have information that indicates to the server 105 that the parking spot 120 is occupied by the first automobile 125 for an undefined period of time. Such information may be collected from all automobiles parked in the parking lot and used for various purposes such as for example, to configure a display board at an entrance of the parking lot to display a message that reads: "No parking spots available in this parking lot."

In some exemplary embodiments, one or both of the first automobile 125 and the second automobile 135 may be an autonomous vehicle and the various computers such as the computer 115, the computer 130, and the server 105 communicate with each other without human intervention. For example, when the first automobile 125 is an autonomous vehicle, the computer 115 provided in the first automobile 125 may make a determination as to how long the autonomous vehicle is expected to occupy the parking spot 120 based on the nature of a task executed by the autonomous vehicle (delivering a pizza or picking up a package, for example).

Figure 2:
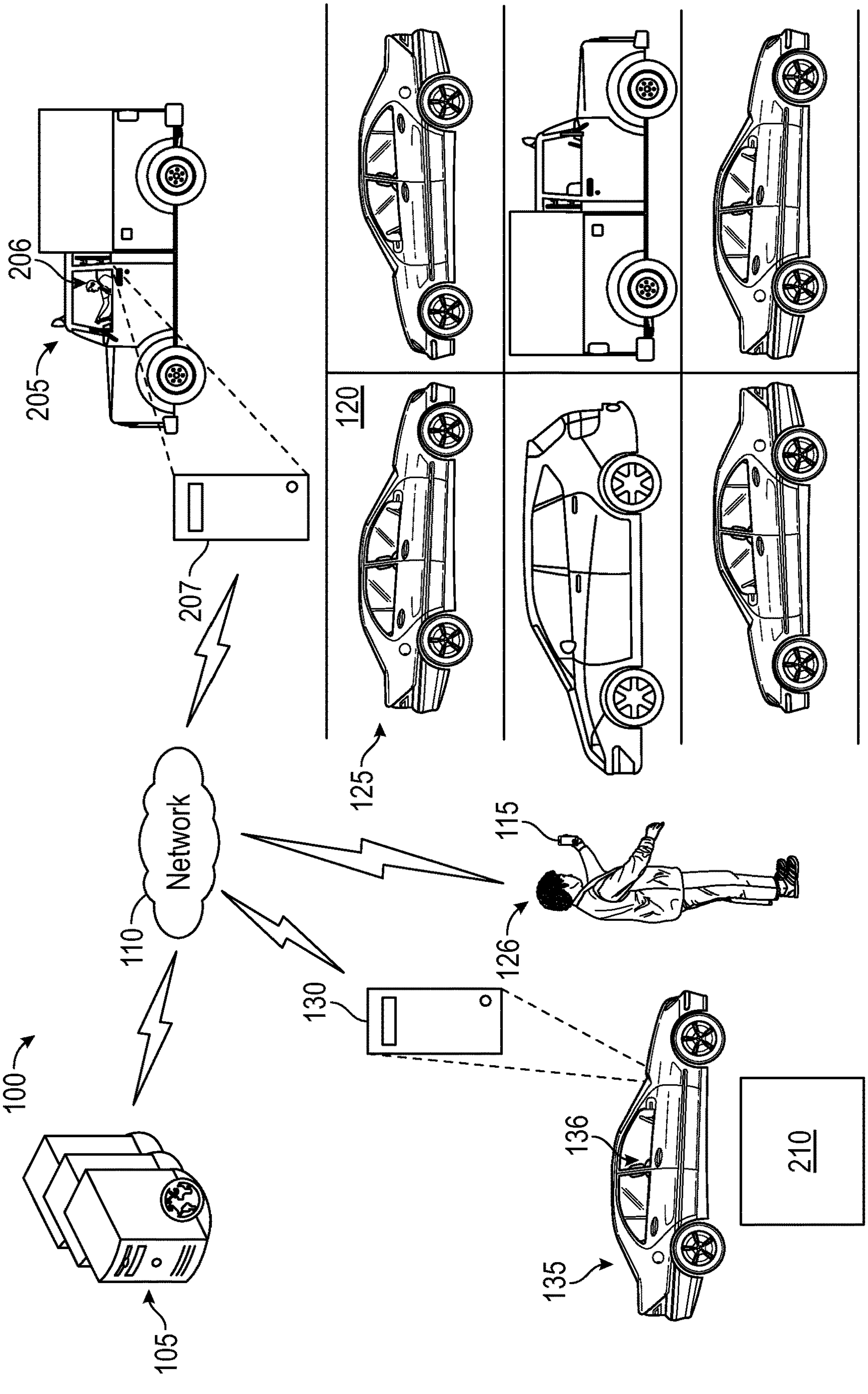
FIG. 2 illustrates an exemplary scenario associated with the parking spot availability prediction system shown in FIG. 1.

FIG. 2 illustrates a first exemplary scenario associated with the parking spot availability prediction system 100. In this first exemplary scenario, the driver 126 of the first automobile 125 is walking back towards the first automobile 125 after completing an errand in a store 210. In this example, the computer 115 is a smartphone carried by the driver 126. The server 105 may communicate with the computer 115 via the network 110 in order to determine a location of the driver 126. The location information of the driver 126 may be derived from a set of GPS coordinates obtained by the computer 115. The server 105 may then determine a separation distance between the driver 126 and the first automobile 125. In one example procedure, the separation distance may be determined by using the GPS coordinates of the computer 115 (smartphone) and the GPS coordinates of the parking spot 120 (or the GPS coordinates of the first automobile 125 that was provided to the server 105 earlier when the first automobile 125 pulled into the parking spot 120).

The server 105 may further communicate with the computer 115 to determine a rate of movement of the driver 126 towards the first automobile 125. This communication may be carried out during a time slot prior to expiry of the expected wait time provided to the driver 136 of the second automobile 135. The server 105 may use information such as the rate of movement of the driver 126 and the separation distance between the driver 126 and the first automobile 125 to update and/or verify the expected wait time that was provided to the driver 136 of the second automobile 135.

In some cases, the driver 126 may use the computer 115 to provide a status update to the server 105. The status update may indicate that the driver 126 is running late and that the first automobile 125 will continue to occupy the first parking spot 120 beyond an expiry of the expected wait time that was provided to the driver 136 of the second automobile 135. The server 105 may use this information, independently or in combination with information such as the rate of movement of the driver 126 towards the first automobile 125 and the separation distance between the driver 126 and the first automobile 125, to recalculate the expected wait time for availability of the parking spot 120. The recalculated wait time may then be transmitted by the server 105 to the computer 130 in the second automobile 135.

In a second exemplary scenario associated with the parking spot availability prediction system 100, a third automobile 205 may enter the parking lot. A driver 206 of the third automobile 205 sees that all parking spots in the parking lot are occupied. The driver 206 may transmit a request to the server 105 via his computer 207 for information pertaining to any upcoming vacancy in the parking spots. The server 105 may examine multiple parking records stored in a database in the server 105 and determine that a parking spot other than the parking spot 120 may become available in the future. The wait time for this other parking spot is longer than the expected wait time that was provided to the driver 136 of the second automobile 135. The server 105 transmits the longer expected wait time to the computer 207 of the driver 206 in the third automobile 205 and provides follow-up action in real time to assist the third automobile 205 to move into the other parking spot when the other parking spot becomes vacant. The actions of the server 105 with respect to the second automobile 135 and the third automobile 205 may thus be carried out as a first-come-first-served policy in accordance with the disclosure.

Each of the computer 130 of the second automobile 135 and the computer 207 of the third automobile 205 is configured to dynamically communicate with the server 105 so as to obtain various types of updates from the server 105 and to provide to the server 105 any updates pertaining to the second automobile 135 and the third automobile 205 respectively. Thus, in at least some cases, the computer 130 may update the server 105 of a decision by the driver 136 of the second automobile 135 to abandon efforts to find a vacant parking spot. Alternatively, the server 105 may detect a termination of communications between the server 105 and the computer 130 and conclude that the driver 136 of the second automobile 135 has decided to abandon efforts to find a vacant parking spot. The server 105 may then provide an update to the computer 207 of the third automobile 205. The update can include a revised estimated wait time that is determined by the server 105 as a result of the abandoning of the effort by the second automobile 135. The server 105 can further communicate with the computer 207 of the third automobile 205 in real time to assist the driver 206 to drive to the parking spot 120 based on the revised estimated wait time.

Figure 3:
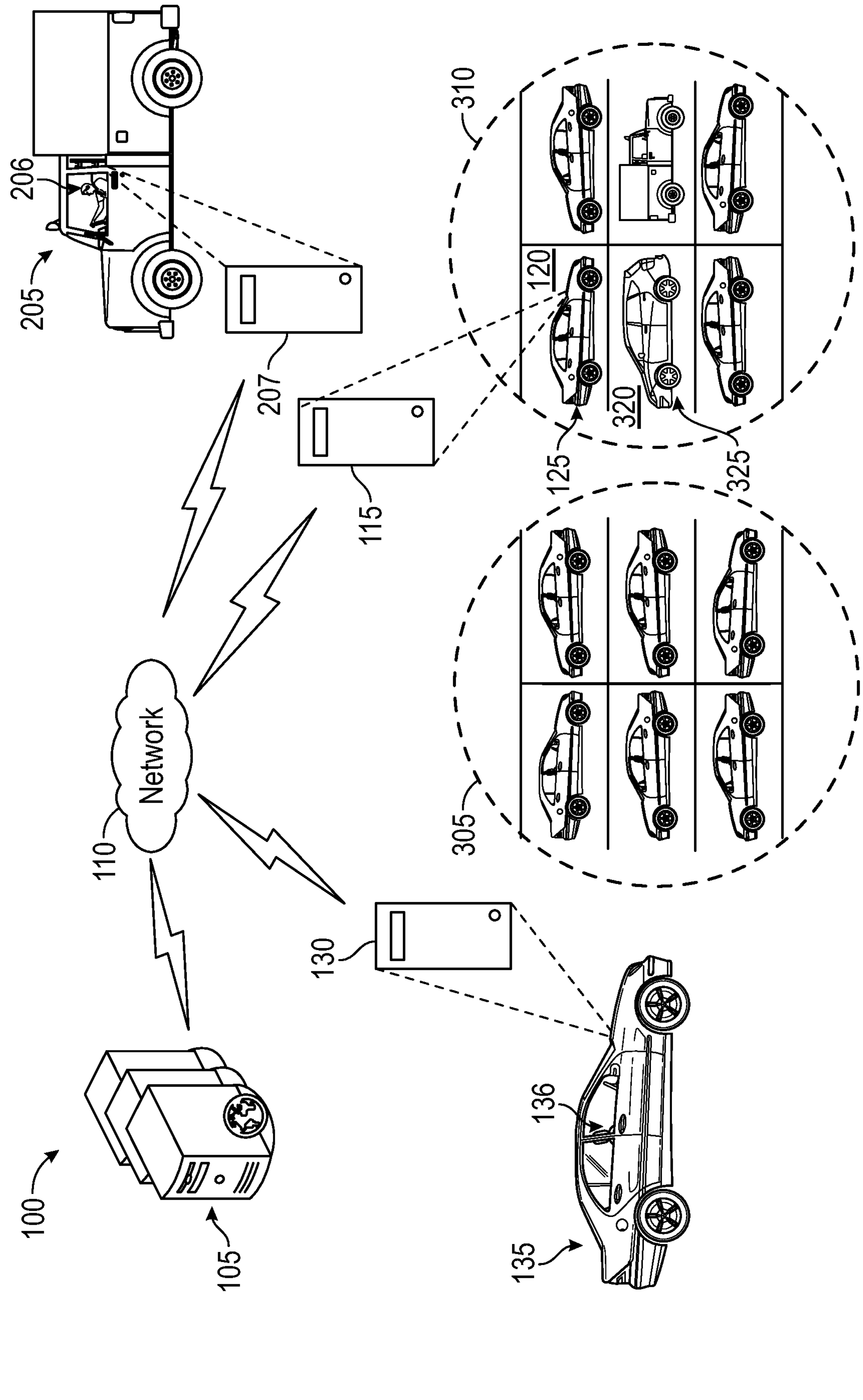
FIG. 3 illustrates a second exemplary embodiment of a parking spot availability prediction system in accordance with the disclosure.

FIG. 3 illustrates a second exemplary embodiment of the parking spot availability prediction system 100 in accordance with the disclosure. The second exemplary embodiment may include various elements such as the server 105 that is communicatively coupled to various computers such as the computer 115, the computer 130, and the computer 207 via the network 110 in the manner described above. However, in this second exemplary embodiment, the parking spot 120 in which the first automobile 125 is parked is located very close to an adjacent parking spot 320 in a group of parking spots. Several other parking spots in the group of parking spots are similarly located very close to each other. Consequently, the server 105 may be unable to obtain location coordinates for the parking spot 120 with enough resolution to distinguish the location of the parking spot 120 in which the first automobile 125 is parked with that of the parking spot 320 in which another automobile 325 is parked.

In some cases, the group of parking spots may be located in an area that is in the middle of high-rise buildings. The high-rise buildings disrupt satellite signal transmissions thereby preventing the various computers from obtaining GPS coordinates for definitively identifying individual parking spots in the group of parking spots. Here again, the server 105 may be unable to obtain location coordinates for the slot 120 with enough resolution to distinguish the location of the parking spot 120 in which the first automobile 125 is parked with that of the parking spot 320 in which another automobile 325 is parked.

The server 105 designates this group of parking spots as a first parking cluster 310. The server 105 may further designate another group of parking spots as a second parking cluster 305. In one exemplary implementation, the designating of various parking clusters may be executed on a static basis such as on the basis of a predetermined number of parking spots located next to each other in a preset geographic location. In another exemplary implementation, the designating of various parking clusters may be executed on a dynamic basis such as on the basis of traffic density, day of week, and/or time of day.

The server 105 may communicate with the computer 115 of the first automobile 125 to obtain information such as the estimated time of occupancy of the parking spot 120 and the identification data pertaining to the first automobile 125. The obtained information may be stored in a database of the server 105 as a first parking record of the first parking cluster 310. Due to the inability to obtain precise location coordinates for the parking spot 120, the first parking record would not include GPS coordinates of the parking spot 120, but may instead include location information obtained from sources such as a physical map or a topographic map.

The server 105 may also communicate with a computer (not shown) that is located in the automobile 325 in order to obtain information such as the estimated time of occupancy of the parking spot 320 and the identification data pertaining to the automobile 325. The obtained information may be stored in the database of the server 105 as a second parking record. The second parking record would not include GPS coordinates of the parking spot 320 but may instead location information of the parking spot 320 obtained from sources such as the physical map or the topographic map used for identifying the location of the parking spot 120. The server 105 may further communicate with other automobiles occupying various other parking spots in the parking cluster 310 in order to obtain information for generating and storing additional parking records in the database of the server 105.

In an example scenario, the driver 136 of the second automobile 135 may use the computer 130 to transmit a request to the server 105 for information pertaining to any upcoming vacancy in the parking spots. The server 105 responds to the request by examining the multiple parking records stored in the database in the server 105 and determines an estimated wait time for obtaining the parking spot 120 occupied by the first automobile 125. The server 105 transmits the estimated wait time to the computer 130 of the second automobile 135.

The driver 136 of the second automobile 135 may opt to notify the server 105 of a willingness to accept the wait time. Upon receipt of the willingness notification, the server 105 may request the computer 115 to provide an indication at a time of vacating of the parking spot 120 by the first automobile 125. If the first automobile 125 vacates the parking spot 120 at the designated time, the server 105 transmits to the computer 130 of the second automobile 135, directions to drive to the vacated parking spot in the parking cluster 310. In one example implementation, the server 105 may transmit directions prior to the vacating of the parking spot 120 so as to enable the second automobile 135 to reach the parking cluster 310 and visually identify the parking spot 120 at an instant in time when the first automobile 125 is pulling out of the parking spot 120. The server 105 may also provide to the computer 130 of the second automobile 135, the identification data to help the driver 136 of the second automobile 135 identify the first automobile 125. However, in some implementations, the server 105 may be configured to prevent transmitting of the identification data, as a security measure to prevent endangerment of the driver 126 of the first automobile 125 in case the driver 136 of the second automobile 135 has malicious intent.

At a later instant in time, the driver 206 of the third automobile 205 may enter the parking lot and use the computer 207 to transmit a request to the server 105 for information pertaining to any upcoming vacancy in the parking spots. The server 105 responds to the request by examining the multiple parking records stored in the database in the server 105 and determines an estimated wait time for obtaining the parking spot 320 occupied by the automobile 325. The server 105 transmits the estimated wait time to the computer 207 of the third automobile 205.

The driver 206 of the third automobile 205 may opt to notify the server 105 of a willingness to accept the wait time. Upon receipt of the willingness notification, the server 105 may request the computer in the automobile 325 to provide an indication at a time of vacating of the parking spot 320 by the automobile 325. If the automobile 325 vacates the parking spot 320 at the designated time, the server 105 transmits to the computer 207 of the third automobile 205, directions to drive to the parking cluster 310 and look for a vacated parking spot.

The server 105 may also transmit to the computer 207 of the third automobile 205, a message to indicate that another vehicle (the second automobile 135) may be cruising around the parking cluster 310 looking for the parking spot 120 at around the same time as when the third automobile 205 reaches the parking cluster 310. The message may also request the driver 206 of the third automobile 205 to desist from stealing the parking spot 120, as a courtesy to the driver 136 of the second automobile 135 who has entered the parking lot ahead of the driver 206. In some implementations, the server 105 may be configured to prevent transmitting of identification data of the automobile 325 to the computer 207, as a security measure to prevent endangerment of the driver 126 of the first automobile 125 in case the driver 206 of the third automobile 205 has malicious intent.

In the example scenario described above, the server 105 responds to the request made by the driver 206 of the third automobile 205 by examining the multiple parking records stored in the database in the server 105 for determining an estimated wait time for the parking spot 320 occupied by the automobile 325. In an alternative scenario, the server 105 may be unable to determine the estimated wait time for the parking spot 320 occupied by the automobile 325 due to various reasons such as for example, an occupancy of the parking spot 320 by the automobile 325 beyond a previously submitted expected time of occupancy. In this case, the server 105 may examine the multiple parking records to determine an estimated wait time for a parking spot in another parking cluster such as the parking cluster 305 and provide instructions to assist the driver 206 of the third automobile 205 to reach the parking cluster 305 after the estimated wait time (or just prior to expiry of the estimated wait time).

Any other automobiles that may enter the parking lot may be serviced by the server 105 on the basis of a first-come-first-served policy. In one exemplary implementation, the first-come-first-served policy may include the server 105 providing estimated wait times on a weighted basis. The server 105 may accordingly provide a second wait time to an automobile that enters the parking lot after entry of a previous automobile that has been provided a first estimated wait time. The second expected wait time is longer than the first estimated wait time.

Figure 4:
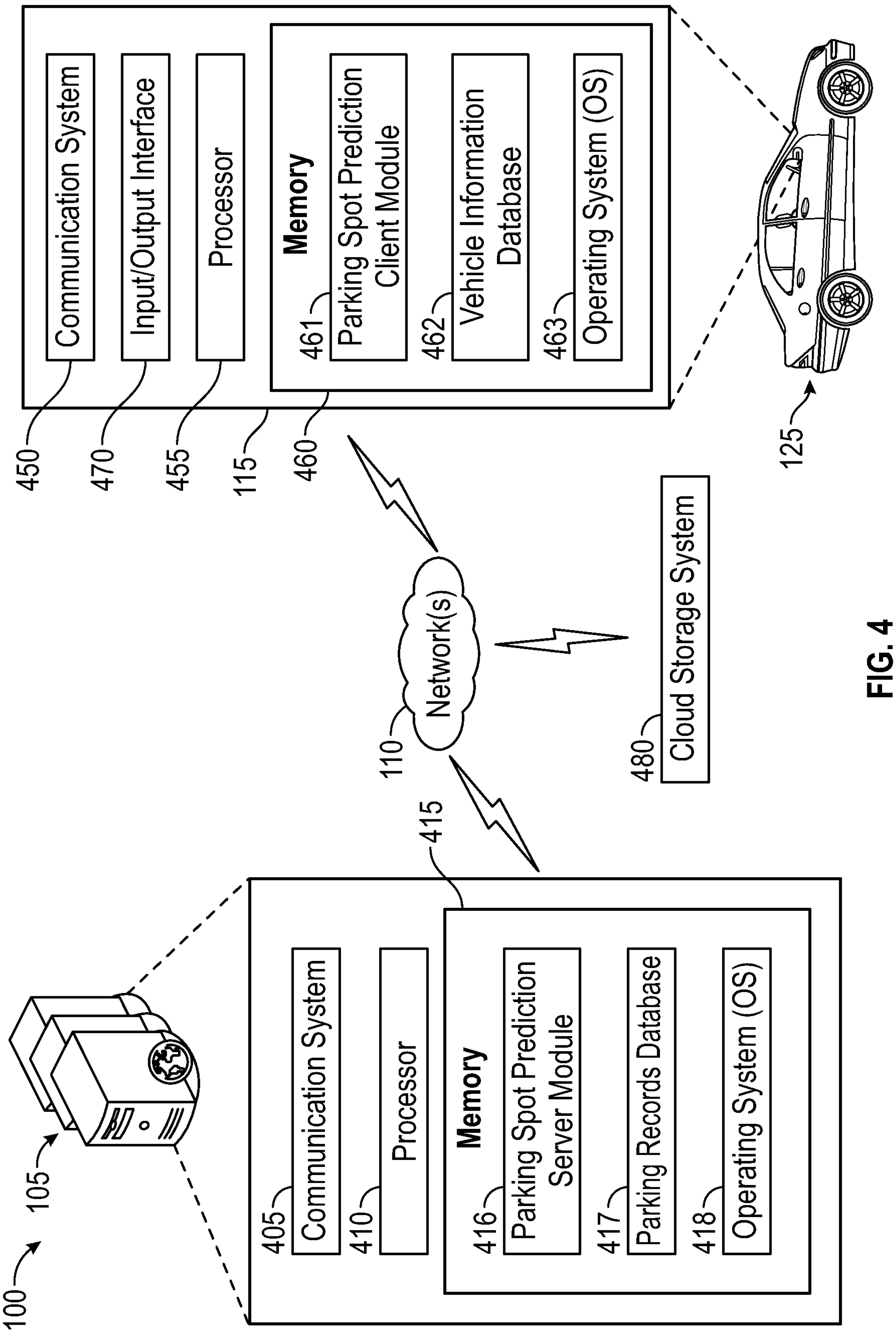
FIG. 4 illustrates some example components of a parking spot availability prediction system in accordance with the disclosure.

FIG. 4 illustrates some example components of the parking spot availability prediction system 100 in accordance with the disclosure. The server 105 can include a processor 410 and a memory 415. The memory 415, which is one example of a non-transitory computer-readable medium, may be used to store an operating system (OS) 418 and various other code modules and databases such as a parking spot prediction server module 416 and a parking records database 417. Some, or all, of the code modules may be configured to use information contained in one or more of the various databases and may also cooperate with various types of hardware provided in the server 105 for executing various operations described herein. For example, the parking spot prediction server module 416 may include software that cooperates with the communications system 405 for communicating with various computers such as the computer 115 provided in the first automobile 125 and the computer 130 provided in the second automobile 135, when executing various methods for predicting parking spot availability in accordance with the disclosure. The various methods may include storing in the parking records database 417, parking records of various automobiles such as the first automobile 125 and the second automobile 135.

The computer 115 located in the first automobile 125 can include a processor 455 and a memory 460. The memory 460, which is another example of a non-transitory computer-readable medium, may be used to store an operating system (OS) 463 and various other code modules and databases such as a parking spot prediction client module 461 and a vehicle information database 462. Some or all of the code modules may be configured to use information contained in one or more of the various databases and may also cooperate with various types of hardware provided in the computer 115 for executing various operations described herein. For example, the parking spot prediction client module 461 may include software that cooperates with a communication system 450 for communicating with the server 105 when executing various methods for predicting parking spot availability in accordance with the disclosure. The various methods may include transmitting information stored in the vehicle information database 462 for storing by the server 105 in the parking records database 417 in the memory 415 of the server 105.

The parking spot prediction client module 461 may further include software that cooperates with an input/output interface 470. The input/output interface 470 may be used to obtain various types of information for use by the computer 115. For example, the input/output interface 470 can be communicatively coupled to a Global Positioning System (GPS) system to automatically obtain GPS coordinates of a location of the first automobile 125 and/or the driver 126 of the first automobile 125 (when the driver 126 is outside the first automobile 125). The GPS coordinates can be transmitted by the communication system 450 to the communications system 405 in the server 105. The processor 410 in the server 105 can then store the GPS coordinates as location information of the first automobile 125 in the parking records database 417.

In some exemplary implementations of the embodiment, at least some of the contents of the memory 415 in the server 105 and/or in the memory 460 of the first automobile 125 (such as the parking records database 417 and the vehicle information database 462) can be partly or completely stored in a cloud storage system 480. The cloud storage system 480 may be communicatively coupled to the server 105 and the computer 115 through the network 110. The computer 130 that is a part of the second automobile 135 may include components that are substantially identical or similar to the components described above with respect to the computer 115.

In the context of hardware, memory devices such as the memory 415 that is a part of the server 105 and the memory 460 that is part of the computer 115 in the first automobile 125, can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to computers such as the server 105 and the computer 115 that is part of the first automobile 125 may be implemented by computer-executable instructions stored on one or more non-transitory computer-readable media such as the memory 415 and the memory 460, that, when executed by one or more processors such as the processor 410 and the processor 455 respectively, perform the recited operations. Generally, computer-executable instructions include routines, programs, objects, components, data structures, and the like that perform particular functions or implement particular abstract data types.

Figure 5:
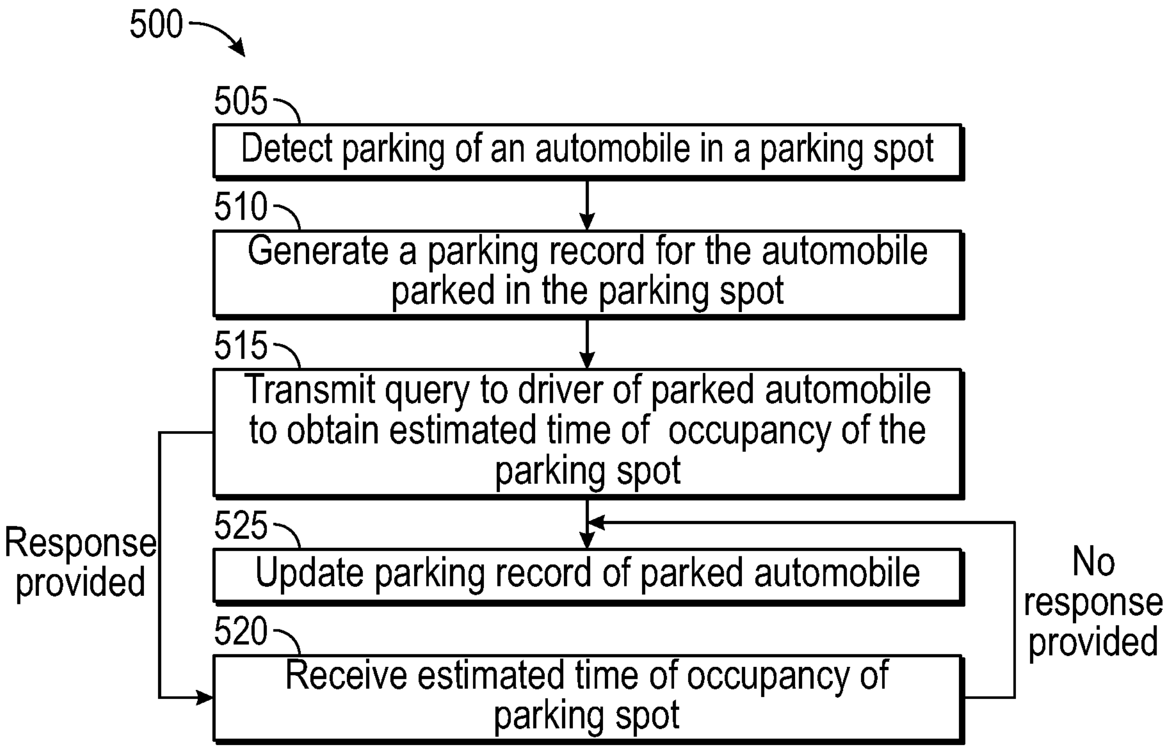
FIG. 5 shows a first flowchart of an exemplary part of a method to predict availability of a parking spot in accordance with the disclosure.

FIG. 5 shows a first flowchart 500 of part of an exemplary method to predict availability of a parking spot in accordance with the disclosure. The first exemplary flowchart 500 (as well as other flowcharts described herein) illustrates a sequence of operations that can be implemented in hardware, software, or a combination thereof. In the context of software, the operations represent computer-executable instructions stored on one or more non-transitory computer-readable media such as the memory 415 in the server 105, that, when executed by one or more processors such as the processor 410, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the exemplary flowchart 500 may be carried out by using an application stored in the memory 415 and executed by the processor 410 of the parking spot availability prediction system 100.

At block 505, parking of the first automobile 125 in the parking spot 120 is detected by the server 105. The detection may be carried out by establishing communications between the communication system 405 in the server 105 and the communication system 450 in the computer 115 of the first automobile 125 (shown in FIG. 4).

At block 510, a parking record of the first automobile 125 may be generated by the server 105. The parking record, which can include vehicle identification and location information of the first automobile 125, may be stored in the parking records database 417 of the server 105. The server 105 may also generate a timestamp to mark a start time of the occupancy of the parking spot 120 by the first automobile 125 and store the timestamp in the parking records database 417 of the server 105 as well.

At block 515, the server 105 transmits a query to the computer 115 inquiring about an estimated time of occupancy of the parking spot 120 by the first automobile 125. The driver 126 of the first automobile 125 may either provide a response or fail to do so. When the first automobile 125 is an autonomous vehicle, a response may be provided if the autonomous vehicle is able to determine the estimated time of occupancy, and may not be provided if the autonomous vehicle is unable to determine the estimated time of occupancy.

If a response is provided, at block 520, the estimated time of occupancy of the parking spot 120 is received by the server 105 and a timestamp may be generated. At block 525, the server 105 may update the parking records database 417 by adding the estimated time of occupancy (if provided by the first automobile 125).

If no response is provided, at block 525, the parking records database 417 is configured to store the location information and vehicle identification of the first automobile 125 without including the estimated time of occupancy.

Figure 6:
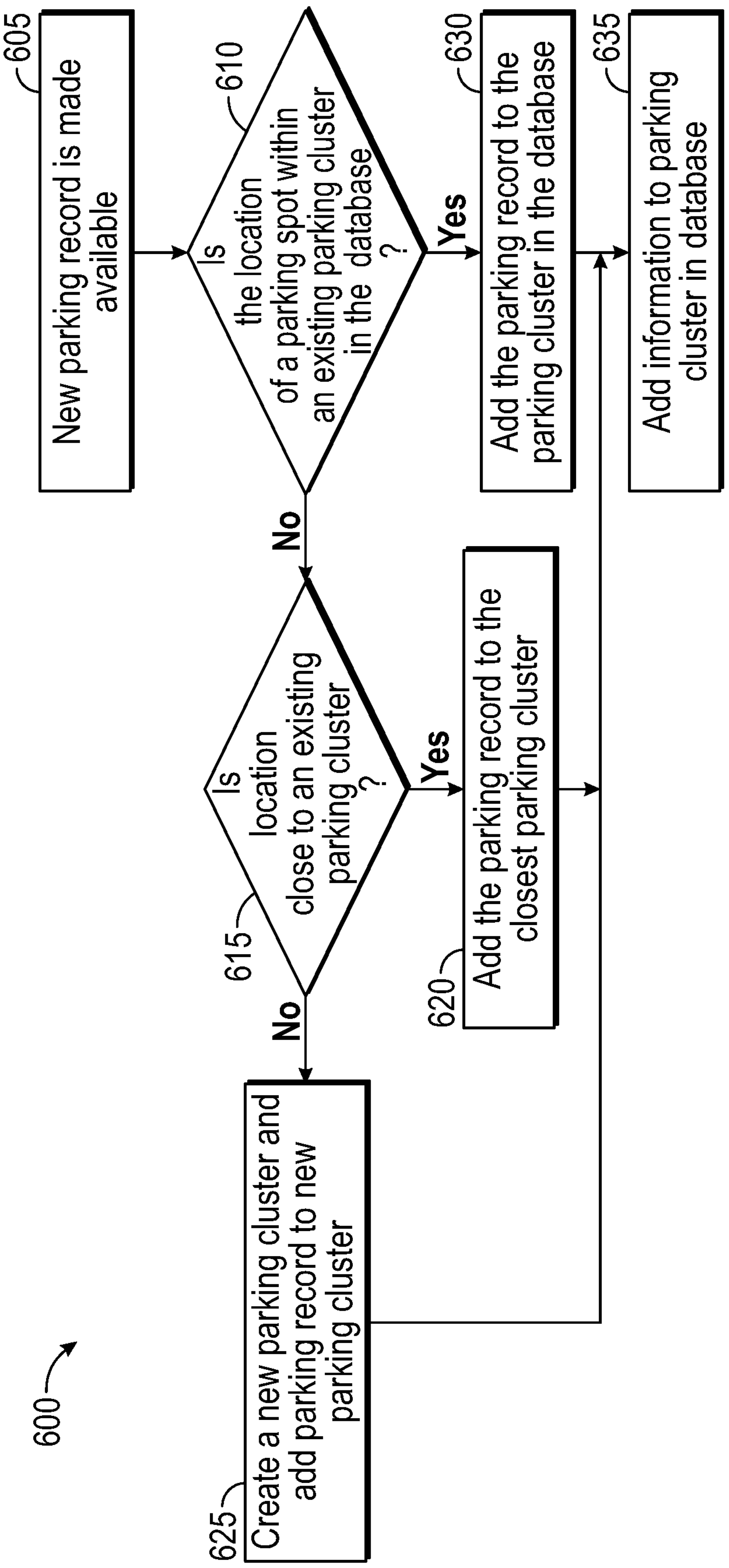
FIG. 6 shows a second flowchart of an exemplary part of a method to predict availability of a parking spot in accordance with the disclosure.

FIG. 6 shows a second flowchart 600 of an exemplary part of a method to predict availability of a parking spot in accordance with the disclosure. This part of the method pertains to operations associated with adding a new parking record to a parking cluster that is stored in the parking records database 417 of the server 105. At block 605, a new parking record is made available to the server 105. The parking record may include information obtained from an automobile that has newly moved into a parking spot. At block 610, the processor 410 of the server 105 makes a determination whether the location of the parking spot is part of a parking cluster that is currently stored in the parking records database 417.

If the parking spot is part of a parking cluster that is currently stored in the parking records database 417, at block 630, the parking record is added to the parking cluster and at block 635, information such as the timestamp and estimated time of occupancy may be added to the parking record. If the parking spot is not a part of a parking cluster currently stored in the parking records database 417, at block 615, the processor 410 makes a determination whether the location of the parking spot is close to any parking cluster stored in the parking records database 417.

If the parking spot is close to a parking cluster stored in the parking records database 417, at block 620, the parking record is added to the parking cluster. The dimensions and other characteristics of the parking cluster may be modified if deemed necessary to include the parking record to the parking cluster. At block 635, information such as the timestamp and estimated time of occupancy may be added to the parking record.

If the parking spot is not close to any parking cluster stored in the parking records database 417, at block 625, a new parking cluster is created and the parking record added to the new parking cluster. At block 635, information such as the timestamp and estimated time of occupancy may be added to the parking record.

Figure 7:
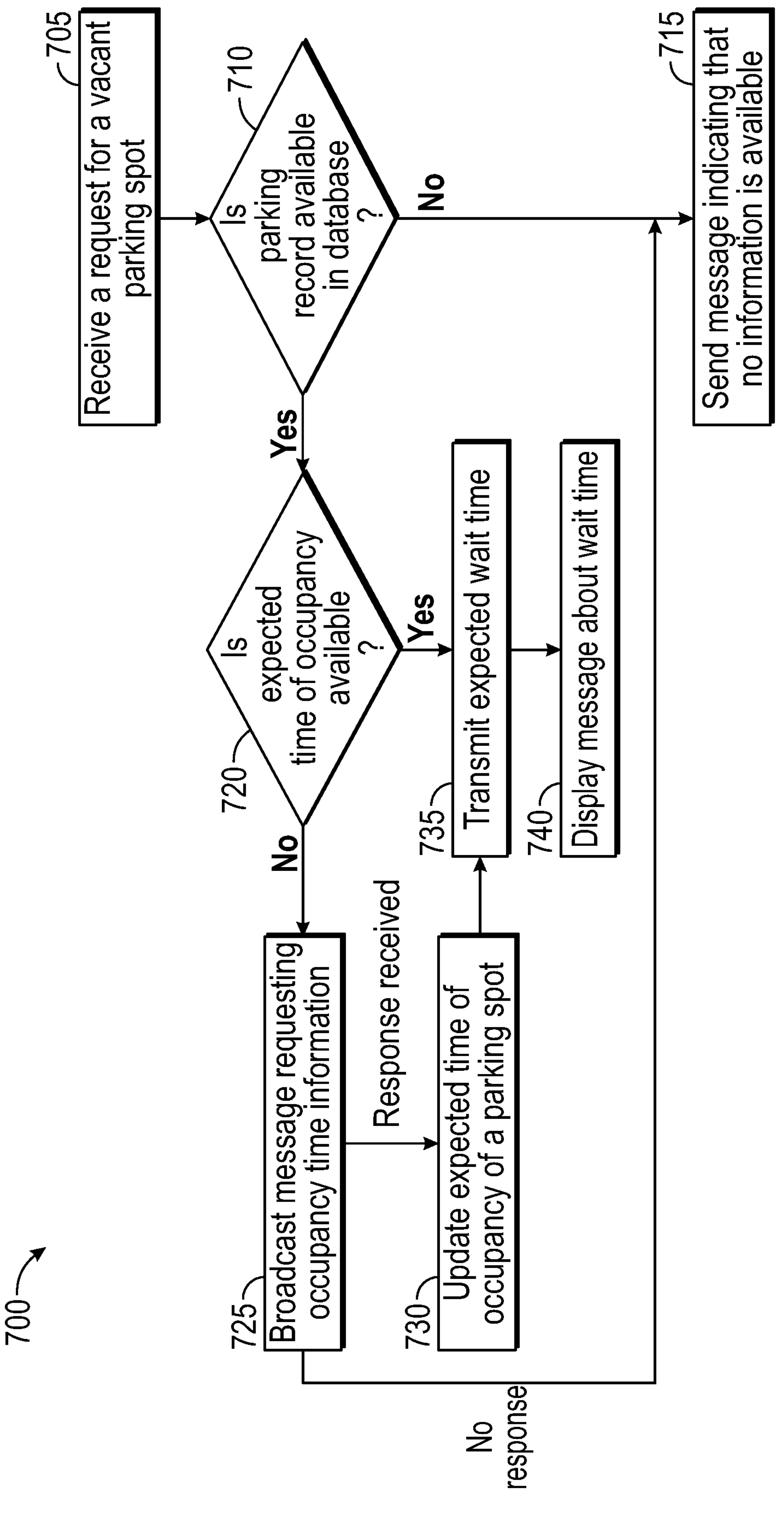
FIG. 7 shows a third flowchart of a part of an exemplary method to predict availability of a parking spot in accordance with the disclosure.

FIG. 7 shows a third flowchart 700 of an exemplary part of a method to predict availability of a parking spot in accordance with the disclosure. This part of the method pertains to operations associated with an automobile seeking a vacant parking spot in a parking lot that is already full. At block 705, the server 105 receives a request for a vacant parking spot. In one example, the request is received from the computer 130 of the second automobile 135. At block 710, the processor 410 of the server 105 checks the parking records database 417 to identify any parking records that may have been provided to the server 105 by other automobiles (such as the first automobile 125).

If no parking record is present in the parking records database 417, at block 715, the server 105 informs the computer 130 of the second automobile 135 that no information is available for assisting the driver 136 of the second automobile 135 to find a vacant parking spot. The parking spot prediction client module in the computer 130 may display to the driver 136, a message such as "No information available."

If at least one parking record is present in the parking records database 417, at block 720, the processor 410 of the server 105 makes a determination whether the parking record has information such as an expected time of occupancy of the parking spot. If the expected time of occupancy information is available, at block 735, the processor 410 provides to the computer 130 of the second automobile 135 an expected wait time for the parking spot. In this case, at block 740, the parking spot prediction client module in the computer 130 may display to the driver 136, a message such as "A parking spot is expected to be available in 12 minutes." The parking spot prediction client module in the computer 130 may also display on a display screen of the computer 130, a graphical representation of a location of the parking spot that is expected to be vacated upon expiry of the wait time.

If at block 720, no expected time of occupancy is available in the parking records database 417, at block 725, the processor 410 of the server 105 may broadcast a message requesting occupancy time information from any automobile that is currently parked in the parking lot. One or more of the automobiles that are parked in the parking lot may forward the broadcast message (or send out an inquiry/request) to smartphones or other mobile devices carried by the respective drivers. An exemplary inquiry such as: "Please confirm your estimated occupancy time of the parking spot" may be provided in the form of a pop-up message on a smartphone of a driver. A response provided by the driver may then be forwarded to the server 105. At block 730, the server 105 updates the expected time of occupancy of a parking spot in the parking records database 417 of the automobile whose driver has provided the response. At block 735, the processor 410 provides to the computer 130 of the second automobile 135 an expected wait time for the parking spot 120. In this case, at block 740, the parking spot prediction client module in the computer 130 may display to the driver 136, a message such as "A parking spot is expected to be available in 25 minutes." The parking spot prediction client module in the computer 130 may also display on a display screen of the computer 130, a graphical representation of a location of the parking spot 120 that is expected to be vacated upon expiry of the wait time.

If the server 105, fails to receive a response to the message requesting occupancy time information from any automobile that is currently parked in the parking lot, at block 715, the server 105 informs the computer 130 of the second automobile 135 that no information is available for assisting to find a vacant parking slot. The parking spot prediction client module (not shown) in the computer 130 may display to the driver 136, a message such as "No information available."

Figure 8:
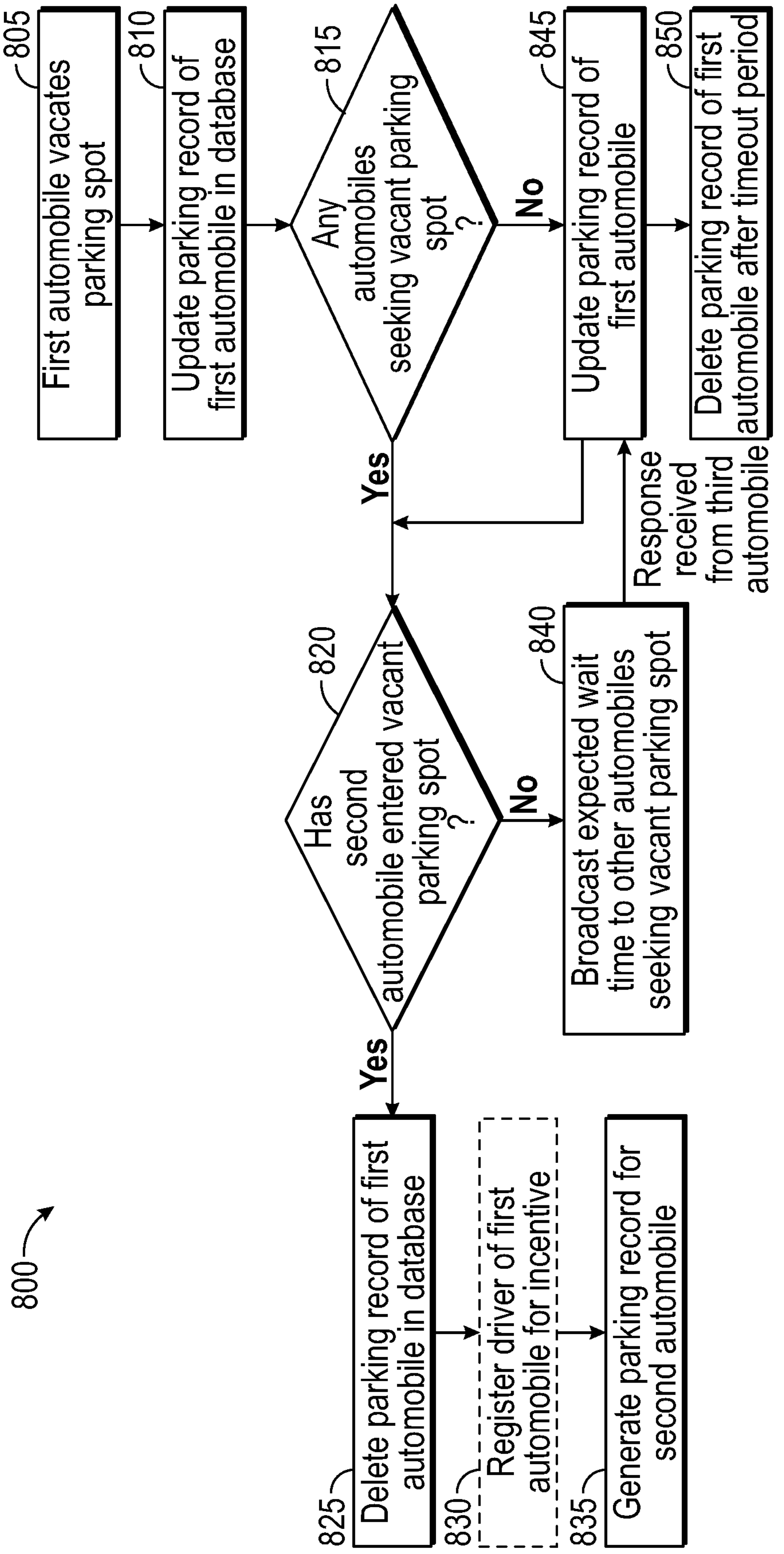
FIG. 8 shows a fourth flowchart of an exemplary part of a method to predict availability of a parking spot in accordance with the disclosure.

FIG. 8 shows a fourth flowchart 800 of an exemplary part of a method to predict availability of a parking spot in accordance with the disclosure. This part of the method pertains to operations associated with an automobile vacating a parking spot. At block 805, a parked automobile vacates a parking spot. For example, the first automobile 125 vacates the parking spot 120. The computer 115 may use the parking spot prediction client module 461 to notify the server 105 of the vacating. At block 810, the parking records database 417 in the server 105 is updated to null-out the expected time of occupancy of the parking spot 120 by the first automobile 125.

At block 815, the processor 410 of the server 105 makes a determination whether any automobile is currently seeking a vacant parking spot. If an automobile, such as the second automobile 135, is seeking a vacant spot, at block 820, a determination is made whether the second automobile 135 has entered and parked in the parking spot 120 that was vacated by the first automobile 125. If the second automobile 135 has entered and parked in the parking spot 120, at block 825, the parking record of the first automobile 125 is deleted from the parking records database 417 in the server 105. At block 830, the driver 126 of the first automobile 125 may be registered for rewarding of an incentive for participating in the parking spot availability prediction operations. Block 830 may be optional in some embodiments.

At block 835, the server 105 transmits a query to the computer 130 of the second automobile 135 to inquire about an estimated time of occupancy of the parking spot 120 by the second automobile 135. The parking record of the second automobile 135 is entered into the parking records database 417 in the server 105.

If, at block 820, the determination indicates that the second automobile 135 has not entered the parking spot 120 that was vacated by the first automobile 125, at block 840, an expected wait time for obtaining the parking spot 120 may be broadcast to other automobiles seeking a vacant parking spot. The second automobile 135 may have failed to enter the parking spot 120 for example because the second driver 136 has abandoned efforts to find a parking spot.

If a response is received from a vehicle (such as the third automobile 205, for example), at block 845, the parking record of the first automobile 125 is updated in the parking records database 417 in the server 105. The updating can include nulling-out the expected time of occupancy of the parking spot 120 by the first automobile 125. The operations indicated at block 820, block 825, block 830, and block 835 may then be executed.

If at block 815, the processor 410 of the server 105 makes the determination that there are no automobiles currently seeking a vacant parking spot, at block 845, the parking record of the first automobile 125 is updated in the parking records database 417 in the server 105. The updating can include nulling-out the expected time of occupancy of the parking spot 120 by the first automobile 125. In some cases, the parking record of the first automobile 125 may be retained in the parking records database 417 for a predetermined period of time in order to carry out some actions such as registering the driver 126 of the first automobile 125 for rewards (as an incentive for participating in the parking spot availability prediction operations). After expiry of the predetermined period of time, at block 850, the parking record of the first automobile 125 is deleted from the parking records database 417 in the server 105.

Example Embodiments

In some instances, the following examples may be implemented together or separately by the systems and methods described herein.

Example 1 may include a method comprising: receiving, by a server, from a first computer located in a first vehicle or a mobile device, an estimated time of occupancy of a parking spot by the first vehicle; generating, by the server, at least one of a timestamp that is indicative of a start time of occupancy of the parking spot by the first vehicle or a countdown from the start time of occupancy of the parking spot by the first vehicle; receiving, by the server, from a second computer located in a second vehicle, a first request for a vacant parking spot; determining, by the server, in response to the first request, and based at least in part on one or more of the estimated time of occupancy of the parking spot by the first vehicle, the at least one of the timestamp or the countdown, and a time of receipt of the first request by the server, a first expected wait time for the second vehicle to obtain the parking spot occupied by the first vehicle; and transmitting, by the server, to the second computer, the first expected wait time.

Example 2 may include the method of example 1 and/or some other example herein, further comprising: receiving, by the server, from the first computer, an indication of a vacating of the parking spot by the first vehicle; transmitting, by the server to the second computer, a set of coordinates corresponding to the parking spot that has been vacated; and providing, by the second computer, to a driver of the second vehicle, based at least in part on the set of coordinates transmitted by the server to the second computer, driving directions to reach the parking spot.

Example 3 may include the method of example 1 and/or some other example herein, wherein the first computer is at least one of a smartphone carried by a driver of the first vehicle, a laptop computer carried by the driver of the first vehicle, a tablet computer carried by the driver of the first vehicle or an apparatus installed in the first vehicle, and wherein the estimated time of occupancy is provided to the first computer by one of a driver or a passenger of the first vehicle.

Example 4 may include the method of example 1 and/or some other example herein, further comprising: receiving, by the server, from the first computer, an indication that the first vehicle is continuing to occupy the parking spot after expiry of the first expected wait time; receiving, by the server, from the first computer, an estimated delay time in vacating the parking spot, the estimated delay time provided by a driver of the first vehicle to the first computer; determining, by the server, based at least in part on the estimated time delay, a second expected wait time for obtaining the parking spot occupied by the first vehicle; and transmitting, by the server, to the second computer, the second expected wait time.

Example 5 may include the method of example 1 and/or some other example herein, further comprising: receiving, by the server, from the first computer, an indication that the first vehicle is continuing to occupy the parking spot after expiry of the first expected wait time; receiving, by the server, from the first computer, an indication that a driver of the first vehicle has failed to provide an estimated delay time in vacating the parking spot; and transmitting, by the server to the second computer, an indication that the parking spot is one of unavailable or is expected to be available at a later instant in time.

Example 6 may include the method of example 1 and/or some other example herein, wherein the first computer is contained in a smartphone carried by a driver of the first vehicle, and further comprising: receiving, by the server, from the smartphone, location information of the driver of the first vehicle when outside the first vehicle; receiving, by the server, from the smartphone, a rate of movement of the driver of the first vehicle towards the first vehicle during a time slot prior to expiry of the first expected wait time; determining, by the server, based on at least the rate of movement and a location of the driver of the first vehicle, a second expected wait time for obtaining the parking spot occupied by the first vehicle; and transmitting, by the server to the second computer, the second expected wait time for obtaining the parking spot occupied by the first vehicle.

Example 7 may include the method of example 1 and/or some other example herein, further comprising: receiving, by the server, from a third computer located in a third vehicle, a second request for a vacant parking spot; allocating, by the server, a second expected wait time that is longer than the first expected wait time; and transmitting, by the server, to the second computer, the second expected wait time.

Example 8 may include a method comprising: designating, by a server, a first set of parking spots as a first parking cluster; receiving, by the server, from a first computer located in a first vehicle, an estimated time of occupancy of a first parking spot in the first parking cluster by the first vehicle; generating, by the server, at least one of a first timestamp that is indicative of a start time of occupancy of the first parking spot in the first parking cluster by the first vehicle or a first countdown from the start time of occupancy of the first parking spot in the first parking cluster by the first vehicle; determining, by the server, based at least in part on one or more of the estimated time of occupancy of the first parking spot in the first parking cluster by the first vehicle and the at least one of the first timestamp or the first countdown, a first expected wait time for availability of the first parking spot in the first parking cluster; receiving, in the server, from a second computer located in a second vehicle, an estimated time of occupancy of a second parking spot in the first parking cluster by the second vehicle; generating, by the server, at least one of a second timestamp that is indicative of a start time of occupancy of the second parking spot in the first parking cluster by the second vehicle or a second countdown from the start time of occupancy of the second parking spot in the first parking cluster by the second vehicle; determining, by the server, based at least in part on one or more of the estimated time of occupancy of the second parking spot in the first parking cluster by the second vehicle and the at least one of the second timestamp or the second countdown, a second expected wait time for availability of the second parking spot in the first parking cluster; receiving, by the server, from a third computer located in a third vehicle, a first request for a vacant parking spot; and transmitting, by the server, to the third computer, a shorter one of the first expected wait time or the second expected wait time.

Example 9 may include the method of example 8 and/or some other example herein, wherein the first parking cluster is designated at least in part on an inability of the server to obtain location coordinates for individual parking spots in the first set of parking spots.

Example 10 may include the method of example 8 and/or some other example herein, further comprising: receiving, by the server, from a fourth computer located in a fourth vehicle, a second request for a vacant parking spot; and transmitting, by the server, to the fourth computer, a longer one of the first expected wait time or the second expected wait time.

Example 11 may include the method of example 8 and/or some other example herein, further comprising: designating, by the server, a second set of parking spots as a second parking cluster; receiving, by the server, from a fourth computer located in a fourth vehicle, an estimated time of occupancy of a first parking spot in the second parking cluster by the fourth vehicle; generating, by the server, at least one of a third timestamp that is indicative of a start time of occupancy of the first parking spot in the second parking cluster by the fourth vehicle or a third countdown from the start time of occupancy of the first parking spot in the second parking cluster by the fourth vehicle; and determining, by the server, based at least in part on one or more of the estimated time of occupancy of the first parking spot in the second parking cluster by the fourth vehicle and the at least one of the third timestamp or the third countdown, a third expected wait time for availability of the first parking spot in the second parking cluster.

Example 12 may include the method of example 11 and/or some other example herein, further comprising: receiving, by the server, from a fifth computer located in a fifth vehicle, a third request for a vacant parking spot; and transmitting, by the server, to the fifth computer, one of the third expected wait time or a longer one of the first expected wait time and the second expected wait time.

Example 13 may include a parking spot availability prediction system comprising: a server, comprising: at least one memory that stores computer-executable instructions;

and at least one processor configured to access the at least one memory and execute the computer-executable instructions to at least: receive from a first computer located in a first vehicle, an estimated time of occupancy of a parking spot by the first vehicle; generate at least one of a timestamp that is indicative of a start time of occupancy of the parking spot by the first vehicle or a countdown from the start time of occupancy of the parking spot by the first vehicle; receive from a second computer located in a second vehicle, a first request for a vacant parking spot; determine, in response to the first request, and based at least in part on one or more of the estimated time of occupancy of the parking spot by the first vehicle, the at least one of the timestamp or the countdown, and a time of receipt of the first request by the server, a first expected wait time for the second vehicle to obtain the parking spot occupied by the first vehicle; and transmit, to the second computer, the first expected wait time.

Example 14 may include the parking spot availability prediction system of example 13 and/or some other example herein, wherein the at least one processor is configured to access the at least one memory and execute additional computer-executable instructions to at least: receive from the first computer, an indication of a vacating of the parking spot by the first vehicle; and transmit to the second computer, a set of coordinates corresponding to the parking spot that has been vacated, the set of coordinates useable by the second computer to provide, to a driver of the second vehicle, driving directions to reach the parking spot.

Example 15 may include the parking spot availability prediction system of example 13 and/or some other example herein, wherein the second computer is at least one of a smartphone carried by a driver of the second vehicle, a laptop computer carried by the driver of the second vehicle, a tablet computer carried by the driver of the second vehicle or an apparatus installed in the second vehicle.

Example 16 may include the parking spot availability prediction system of example 13 and/or some other example herein, wherein the second computer is a smartphone containing a software application that generates the first request received by the server.

Example 17 may include the parking spot availability prediction system of example 13 and/or some other example herein, wherein the at least one processor is configured to access the at least one memory and execute additional computer-executable instructions to at least: receive from the first computer, an indication that the first vehicle is continuing to occupy the parking spot after expiry of the first expected wait time; receive from the first computer, an estimated delay time in vacating the parking spot; determine, based at least in part on the estimated time delay, a second expected wait time for obtaining the parking spot occupied by the first vehicle; and transmit to the second computer, the second expected wait time.

Example 18 may include the parking spot availability prediction system of example 13 and/or some other example herein, wherein the at least one processor is configured to access the at least one memory and execute additional computer-executable instructions to at least: receive from the first computer, an indication that the first vehicle is continuing to occupy the parking spot after expiry of the first expected wait time; receive from the first computer, an indication that a driver of the first vehicle has failed to provide an estimated delay time in vacating the parking spot; and transmit to the second computer, an indication that the parking spot is one of unavailable or is expected to be available at a later instant in time.

Example 19 may include the parking spot availability prediction system of example 13 and/or some other example herein, wherein the first computer is a smartphone carried by a driver of the first vehicle, and wherein the at least one processor in the server is configured to access the at least one memory in the server and execute additional computer-executable instructions to at least: receive from the smartphone, location information of the driver of the first vehicle when the driver is outside the first vehicle; receive from the smartphone, a rate of movement of the driver of the first vehicle towards the first vehicle during a time slot prior to expiry of the first expected wait time; determine, based on at least the rate of movement and a location of the driver of the first vehicle, a second expected wait time for obtaining the parking spot occupied by the first vehicle; and transmit to the second computer, the second expected wait time for obtaining the parking spot occupied by the first vehicle.

Example 20 may include the parking spot availability prediction system of example 13 and/or some other example herein, wherein the at least one processor in the server is configured to access the at least one memory in the server and execute additional computer-executable instructions to at least: receive from a third computer located in a third vehicle, a second request for a vacant parking spot; allocate a second expected wait time that is longer than the first expected wait time; and transmit to the second computer, the second expected wait time.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:

receiving, by a server, from a first computer located in a first vehicle or a mobile device, an estimated time of occupancy of a parking spot by the first vehicle;

generating, by the server, at least one of a timestamp that is indicative of a start time of occupancy of the parking spot by the first vehicle or a countdown from the start time of occupancy of the parking spot by the first vehicle;

receiving, by the server, from a second computer located in a second vehicle, a first request for a vacant parking spot;

determining, by the server, in response to the first request, and based at least in part on one or more of the estimated time of occupancy of the parking spot by the first vehicle, the at least one of the timestamp or the countdown, and a time of receipt of the first request by the server, a first expected wait time for the second vehicle to obtain the parking spot occupied by the first vehicle;

transmitting, by the server, to the second computer, the first expected wait time;

receiving, by the server, from the first computer, an indication that the first vehicle is continuing to occupy the parking spot after expiry of the first expected wait time;

receiving, by the server, from the first computer, an estimated delay time in vacating the parking spot, the estimated delay time provided by a driver of the first vehicle to the first computer;

determining, by the server, based at least in part on the estimated time delay, a second expected wait time for obtaining the parking spot occupied by the first vehicle; and transmitting, by the server, to the second computer, the second expected wait time.

2. The method of claim 1, further comprising:

receiving, by the server, from the first computer, an indication of a vacating of the parking spot by the first vehicle;

transmitting, by the server to the second computer, a set of coordinates corresponding to the parking spot that has been vacated; and providing, by the second computer, to a driver of the second vehicle, based at least in part on the set of coordinates transmitted by the server to the second computer, driving directions to reach the parking spot.

3. The method of claim 1, wherein the first computer is at least one of a smartphone carried by a driver of the first vehicle, a laptop computer carried by the driver of the first vehicle, a tablet computer carried by the driver of the first vehicle or an apparatus installed in the first vehicle, and wherein the estimated time of occupancy is provided to the first computer by one of a driver or a passenger of the first vehicle.

4. A method comprising:

designating, by a server, a first set of parking spots as a first parking cluster;

receiving, by the server, from a first computer located in a first vehicle, an estimated time of occupancy of a first parking spot in the first parking cluster by the first vehicle;

generating, by the server, at least one of a first timestamp that is indicative of a start time of occupancy of the first parking spot in the first parking cluster by the first vehicle or a first countdown from the start time of occupancy of the first parking spot in the first parking cluster by the first vehicle;

determining, by the server, based at least in part on one or more of the estimated time of occupancy of the first parking spot in the first parking cluster by the first vehicle and the at least one of the first timestamp or the first countdown, a first expected wait time for availability of the first parking spot in the first parking cluster;

receiving, in the server, from a second computer located in a second vehicle, an estimated time of occupancy of a second parking spot in the first parking cluster by the second vehicle;

generating, by the server, at least one of a second timestamp that is indicative of a start time of occupancy of the second parking spot in the first parking cluster by the second vehicle or a second countdown from the start time of occupancy of the second parking spot in the first parking cluster by the second vehicle;

determining, by the server, based at least in part on one or more of the estimated time of occupancy of the second parking spot in the first parking cluster by the second vehicle and the at least one of the second timestamp or the second countdown, a second expected wait time for availability of the second parking spot in the first parking cluster;

receiving, by the server, from a third computer located in a third vehicle, a first request for a vacant parking spot; and transmitting, by the server, to the third computer, a shorter one of the first expected wait time or the second expected wait time, wherein the first parking cluster is designated at least in part on an inability of the server to obtain location coordinates for individual parking spots in the first set of parking spot.

5. The method of claim 4, further comprising:

receiving, by the server, from a fourth computer located in a fourth vehicle, a second request for a vacant parking spot; and transmitting, by the server, to the fourth computer, a longer one of the first expected wait time or the second expected wait time.

6. The method of claim 4, further comprising:

designating, by the server, a second set of parking spots as a second parking cluster;

receiving, by the server, from a fourth computer located in a fourth vehicle, an estimated time of occupancy of a first parking spot in the second parking cluster by the fourth vehicle;

generating, by the server, at least one of a third timestamp that is indicative of a start time of occupancy of the first parking spot in the second parking cluster by the fourth vehicle or a third countdown from the start time of occupancy of the first parking spot in the second parking cluster by the fourth vehicle; and determining, by the server, based at least in part on one or more of the estimated time of occupancy of the first parking spot in the second parking cluster by the fourth vehicle and the at least one of the third timestamp or the third countdown, a third expected wait time for availability of the first parking spot in the second parking cluster.

7. The method of claim 6, further comprising:

receiving, by the server, from a fifth computer located in a fifth vehicle, a third request for a vacant parking spot; and transmitting, by the server, to the fifth computer, one of the third expected wait time or a longer one of the first expected wait time and the second expected wait time.

8. A parking spot availability prediction system comprising:

a server, comprising:

at least one memory that stores computer-executable instructions; and at least one processor configured to access the at least one memory and execute the computer-executable instructions to at least:

receive from a first computer located in a first vehicle, an estimated time of occupancy of a parking spot by the first vehicle;

generate at least one of a timestamp that is indicative of a start time of occupancy of the parking spot by the first vehicle or a countdown from the start time of occupancy of the parking spot by the first vehicle;

receive from a second computer located in a second vehicle, a first request for a vacant parking spot;

determine, in response to the first request, and based at least in part on one or more of the estimated time of occupancy of the parking spot by the first vehicle, the at least one of the timestamp or the countdown, and a time of receipt of the first request by the server, a first expected wait time for the second vehicle to obtain the parking spot occupied by the first vehicle;

transmit, to the second computer, the first expected wait time;

receive from the first computer, an indication that the first vehicle is continuing to occupy the parking spot after expiry of the first expected wait time;

receive from the first computer, an indication that a driver of the first vehicle has failed to provide an estimated delay time in vacating the parking spot; and transmit to the second computer, an indication that the parking spot is one of unavailable or is expected to be available at a later instant in time.

9. The parking spot availability prediction system of claim 8, wherein the at least one processor is configured to access the at least one memory and execute additional computer-executable instructions to at least:

receive from the first computer, an indication of a vacating of the parking spot by the first vehicle; and transmit to the second computer, a set of coordinates corresponding to the parking spot that has been vacated, the set of coordinates useable by the second computer to provide, to a driver of the second vehicle, driving directions to reach the parking spot.

10. The parking spot availability prediction system of claim 8, wherein the second computer is at least one of a smartphone carried by a driver of the second vehicle, a laptop computer carried by the driver of the second vehicle, a tablet computer carried by the driver of the second vehicle or an apparatus installed in the second vehicle.

11. The parking spot availability prediction system of claim 8, wherein the second computer is a smartphone containing a software application that generates the first request received by the server.

12. The parking spot availability prediction system of claim 8, wherein the at least one processor in the server is configured to access the at least one memory in the server and execute additional computer-executable instructions to at least:

receive from a third computer located in a third vehicle, a second request for a vacant parking spot;

allocate a second expected wait time that is longer than the first expected wait time; and transmit to the second computer, the second expected wait time.

13. A method comprising:

receiving, by a server, from a first computer located in a first vehicle or a mobile device, an estimated time of occupancy of a parking spot by the first vehicle;

generating, by the server, at least one of a timestamp that is indicative of a start time of occupancy of the parking spot by the first vehicle or a countdown from the start time of occupancy of the parking spot by the first vehicle;

receiving, by the server, from a second computer located in a second vehicle, a first request for a vacant parking spot;

determining, by the server, in response to the first request, and based at least in part on one or more of the estimated time of occupancy of the parking spot by the first vehicle, the at least one of the timestamp or the countdown, and a time of receipt of the first request by the server, a first expected wait time for the second vehicle to obtain the parking spot occupied by the first vehicle;

transmitting, by the server, to the second computer, the first expected wait time;

wherein the first computer is contained in a smartphone carried by a driver of the first vehicle, and further comprising:

receiving, by the server, from the smartphone, location information of the driver of the first vehicle when outside the first vehicle;

receiving, by the server, from the smartphone, a rate of movement of the driver of the first vehicle towards the first vehicle during a time slot prior to expiry of the first expected wait time;

determining, by the server, based on at least the rate of movement and a location of the driver of the first vehicle, a second expected wait time for obtaining the parking spot occupied by the first vehicle; and transmitting, by the server to the second computer, the second expected wait time for obtaining the parking spot occupied by the first vehicle.

14. A method comprising:

receiving, by a server, from a first computer located in a first vehicle or a mobile device, an estimated time of occupancy of a parking spot by the first vehicle;

generating, by the server, at least one of a timestamp that is indicative of a start time of occupancy of the parking spot by the first vehicle or a countdown from the start time of occupancy of the parking spot by the first vehicle;

receiving, by the server, from a second computer located in a second vehicle, a first request for a vacant parking spot;

determining, by the server, in response to the first request, and based at least in part on one or more of the estimated time of occupancy of the parking spot by the first vehicle, the at least one of the timestamp or the countdown, and a time of receipt of the first request by the server, a first expected wait time for the second vehicle to obtain the parking spot occupied by the first vehicle;

transmitting, by the server, to the second computer, the first expected wait time;

receiving, by the server, from a third computer located in a third vehicle, a second request for a vacant parking spot;

allocating, by the server, a second expected wait time that is longer than the first expected wait time; and transmitting, by the server, to the third computer, the second expected wait time.

* * * * *